(12) United States Patent  
Kojima et al.

(10) Patent No.: US 6,721,237 B2  
(45) Date of Patent: Apr. 13, 2004

(54) COMPOSITE MAGNETIC HEAD DEVICE

(75) Inventors: Kunio Kojima, Nabari (JP); Masaki Hamamoto, Toshima-ku (JP); Junichi Satoh, Nara (JP); Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 363 days.

(21) Appl. No.: 09/803,312

(22) Filed: Mar. 9, 2001

(65) Prior Publication Data

US 2001/0021076 A1 Sep. 13, 2001

(30) Foreign Application Priority Data

Mar. 9, 2000 (JP) ........................................ 2000-065427

(51) Int. Cl.⁷ .............................................. G11B 11/00
(52) U.S. Cl. ................................ 369/13.13; 369/112.03
(58) Field of Search ........................... 369/13.13, 13.33, 369/112.01, 112.03, 112.04, 112.07, 112.1, 112.12, 103, 13.32, 13.24; 300/59

(56) References Cited

U.S. PATENT DOCUMENTS 5,193,082 A * 3/1993 Miyake et al. ........... 369/13.13  
5,808,973 A * 9/1998 Tanaka ........................ 369/14  
6,288,981 B1 * 9/2001 Yoshida et al. .......... 369/13.13  
6,320,841 B1 * 11/2001 Watanabe et al. ........ 369/13.13  
6,496,450 B2 * 12/2002 Watanabe ................. 369/13.38  
6,507,540 B1 * 1/2003 Berg et al. ............... 369/13.13  
6,556,517 B1 * 4/2003 Nakajima ................. 369/13.13  
6,567,347 B1 * 5/2003 Fujimaki et al. ......... 369/13.33

FOREIGN PATENT DOCUMENTS

| JP | 01273252   | 11/1989 |
| JP | 03189905   | 8/1991  |
| JP | 04176034 A | 6/1992  |

* cited by examiner

*Primary Examiner*—Tan Dinh  
(74) *Attorney, Agent, or Firm*—Edwards & Angell, LLP; David G. Conlin; George W. Hartnell, III

(57) ABSTRACT

A composite magnetic head device includes a recording head and a reproducing head for magnetically recording and reproducing information on and from a recording medium, and further includes heat sources for heating the recording medium when recording and reproducing. As the heat sources, diffraction grating patterns for the recording head and the reproducing head are formed independently. With this structure, when recording and reproducing information based on the thermal distribution of the recording medium heated by the heat sources, the thermal damage on the recording medium can be suppressed, and the likelihood of such problem that the recording medium is heated too much and the information recorded in the heated portion are erased can be prevented.

16 Claims, 15 Drawing Sheets

F I G. 4
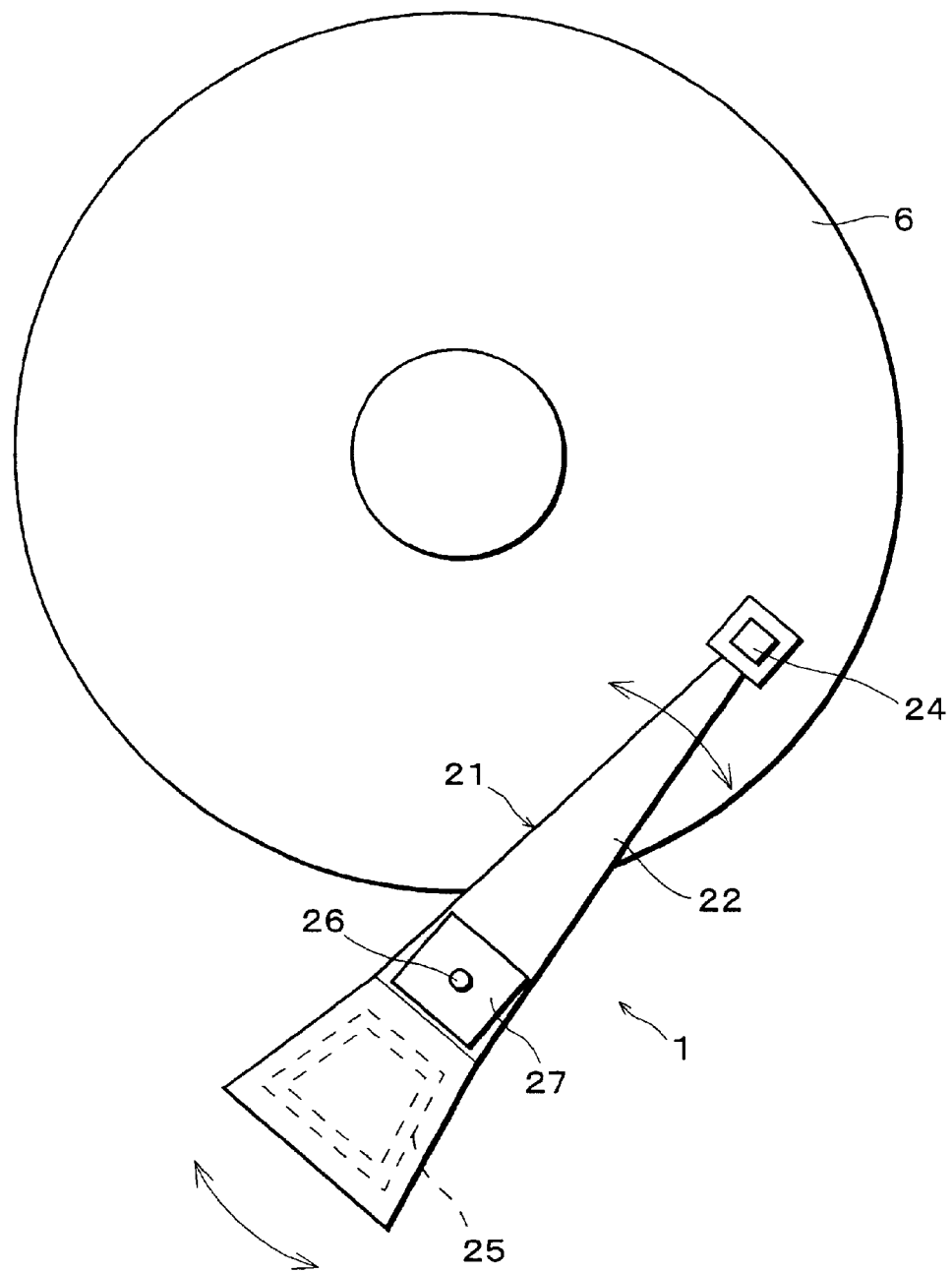

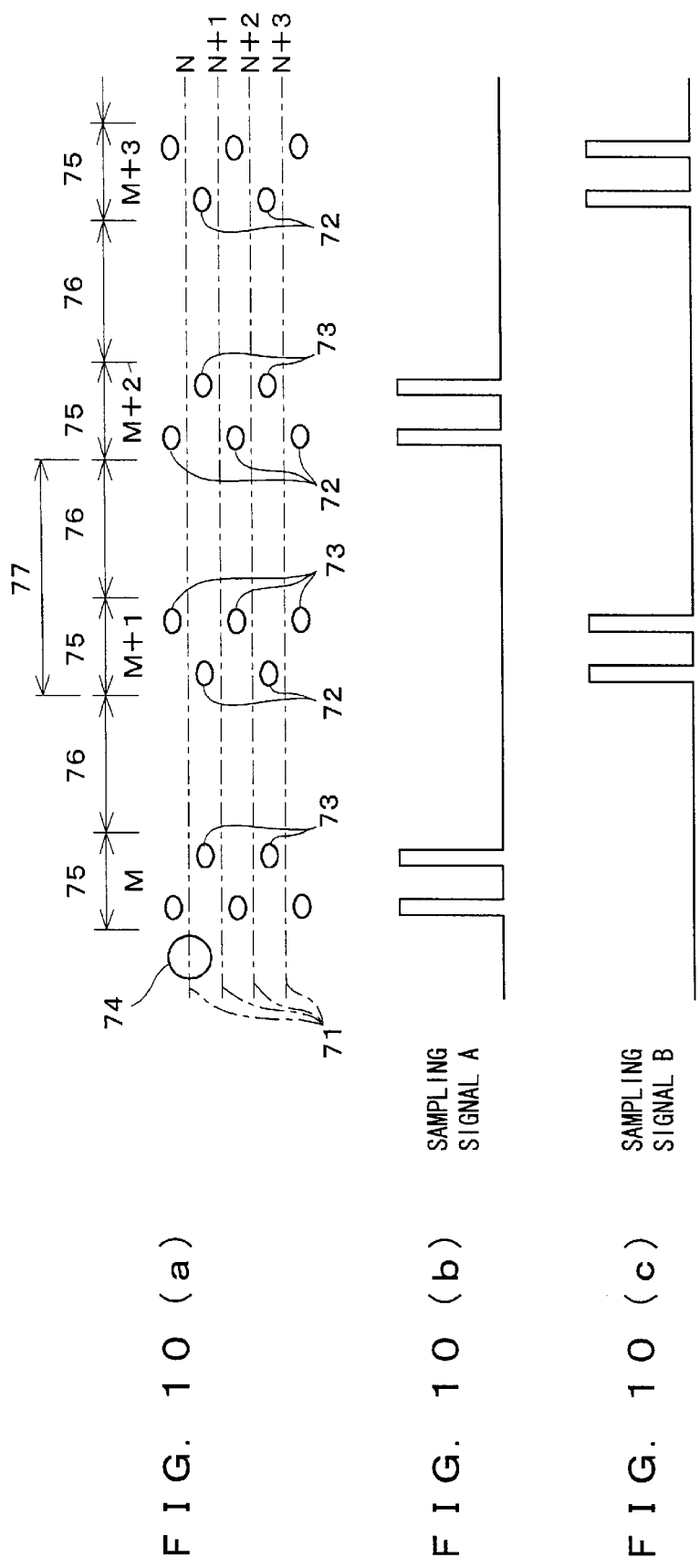

F I G. 1 1 (a)
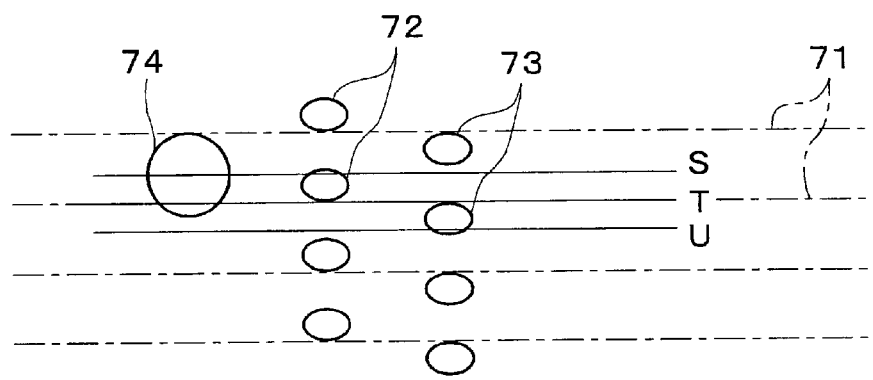
F I G. 1 1 (b)
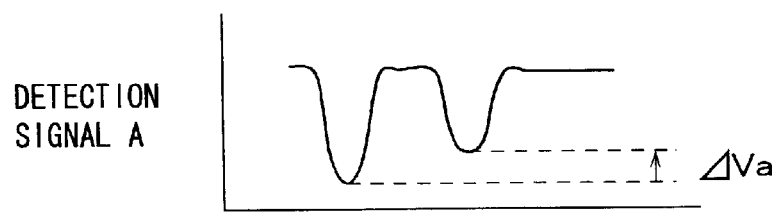
F I G. 1 1 (c)
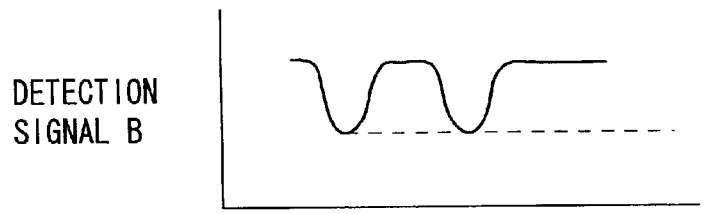
F I G. 1 1 (d)
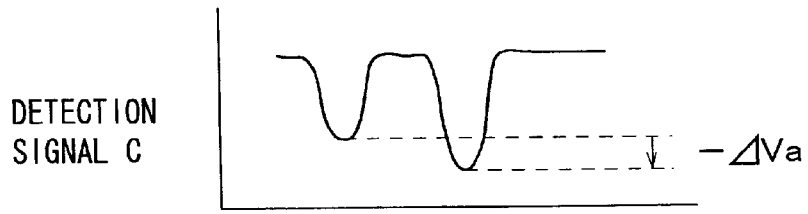

FIG. 15 (a) Prior art
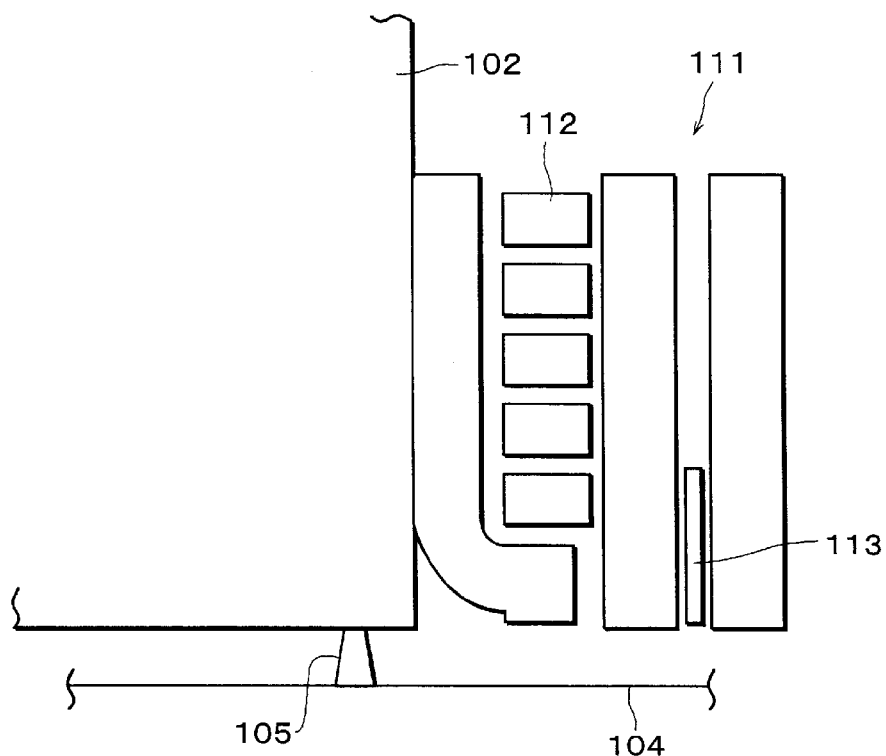
FIG. 15 (b) Prior art
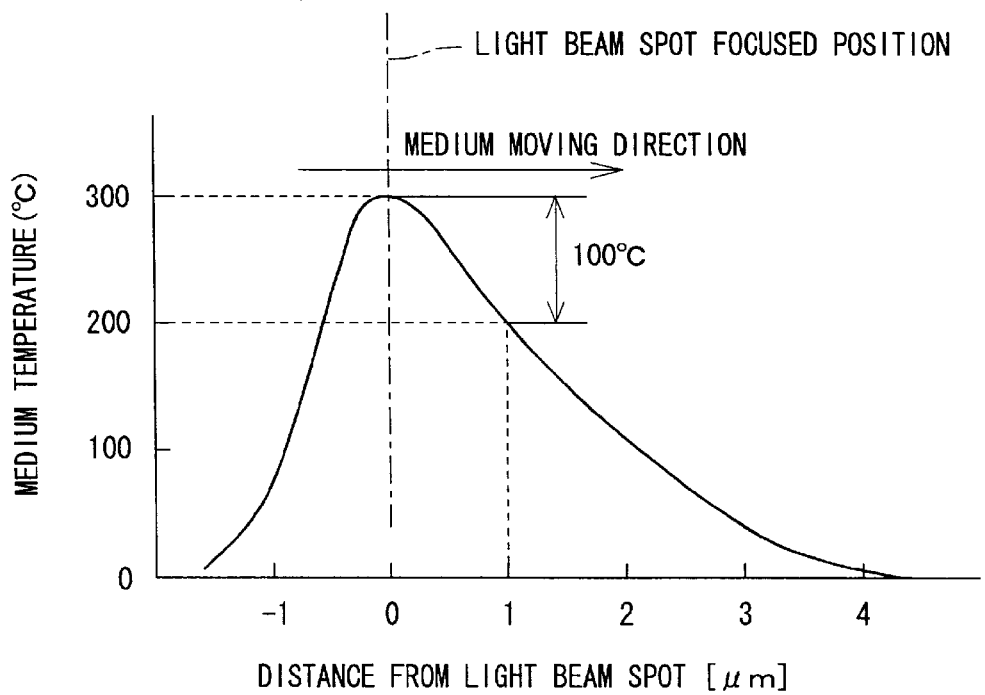

COMPOSITE MAGNETIC HEAD DEVICE

FIELD OF THE INVENTION

The present invention relates to a composite magnetic head device for magnetically recording and reproducing information on and from a recording medium by heating it, and an information recording and reproducing device adopting the same and also relates a recording medium.

BACKGROUND OF THE INVENTION

Recently, various systems which realize high density recording with a combination of the optical technology and the magnetic recording and reproducing technology have been developed, examples of which include a laser assisted magnetic recording and reproducing system. In this magnetic recording and reproducing system, for example, as disclosed in Japanese Unexamined Patent Publication No. 176034/1992 (Tokukaihei 4-176034, published on Jun. 23, 1992), a magnetic recording medium made of a ferrimagnetic material whose compensation temperature is around room temperature is adopted. In this system, a recording operation is performed by heating the recording medium by projecting thereon a laser beam so as to reduce the coercive force of the heated portion. In this state, an external magnetic field is applied to the magnetic recording medium by means of an information recording-use write head, thereby recording information. On the other hand, a reproducing operation is performed by heating the recording medium by projecting thereon a laser beam so as to increase the residual magnetization in a heated portion, and further detecting residual magnetic flux by means of an information reproducing-use read head, thereby reproducing information.

In the foregoing laser assisted magnetic recording and reproducing system, the residual magnetization in a non-heated portion maintained at around room temperature is nearly zero. Therefore, even if the reproducing-use read head width in the crosstalk direction is wider than the track pitch for recording information, it is possible to surely suppress the crosstalk, thereby realizing reproduction of information recorded at high density.

The head structure for the foregoing laser assisted magnetic recording and reproducing system is arranged such that the magnetic head and the optical head are provided opposing one another so as to sandwich a recording medium in between.

However, in the foregoing structure of providing the magnetic head and the optical head separately on opposite sides of the recording medium so as to oppose one another, it is difficult to align the magnetic head and the optical head with desirable conformity, which results in the problem of low productivity. Besides, the foregoing structure is not applicable to both-sided recording medium. Therefore, the foregoing structure hinders an increase in recording capacity. Therefore, the development of a composite structure of the magnetic head and the optical head, which eliminates the need of aligning two heads, and which is applicable to the both-sided recording medium is strongly desired.

In response, various types of such composite structure of the magnetic head and the optical head have been proposed in the fields of magneto-optical recording and the thermomagnetic recording.

For example, (1) Japanese Unexamined Patent Publication No. 273252/1989 (Tokukaihei 1-273252, published on Nov. 1, 1989) discloses a magneto-optical pickup wherein a laser diode and an optical system are incorporated within a magnetic circuit with a spacing. According to the structure of the prior art document (1), the laser emitting section can be matched with the gap of the magnetic head, and therefore a desirable composite structure can be achieved.

(2) Japanese Unexamined Patent Publication No. 189905/1991 (Tokukaihei 3-189905, published on Aug. 19, 1991) discloses a magnetic head device 101 illustrated in FIG. 14, wherein a semiconductor laser 102 and a thin film magnetic head 103 are formed on the same substrate. In this magnetic head device 101, the laser emitting section (semiconductor laser 102) and the thin film magnetic head 103 are formed on the same substrate by the semiconductor manufacturing process. With this structure, a positional displacement between the laser emitting section and the thin film magnetic head 103 can be reduced to around 0.3 $\mu$m.

However, recently, a head device of a laminated structure is adopted to be suited for the high density recording, and the foregoing magnetic circuit with a spacing as disclosed by the prior art document (1) which is not suited for the high density recording does not have much demand. It is therefore not practical to adopt the structure of the prior art document (1).

According to the structure of the prior art document (2), the position of the laser emitting section is not matched with the position of the gap 106 of the magnetic head (thin film magnetic head 103). Therefore, when adopting the magnetic head device 101 of the prior art document (2), information are recorded magnetically utilizing thermal distribution on the recording medium 104. Namely, in this document (2), the structure for desirably raising the temperature of the recording medium 104 by a laser beam 105 has not been discussed.

In the foregoing composite structure wherein the magnetic head and the optical head are provided opposing one another so as to sandwich the recording medium in between, any concrete example for the tracking servo system has not been discussed.

Furthermore, the tracking servo system adopted in the foregoing prior art document (2) is disadvantageous in that the polarity of the positional information used in the servo performance reverses track by track, and the solution to this problem has not been discussed.

SUMMARY OF THE INVENTION

It is an object of the present invention to provide a composite magnetic head device, an information recording and reproducing device adopting the same and a recording medium suited for the laser assisted magnetic recording and reproducing system.

In order to achieve the above object, a composite magnetic head of the present invention is characterized by including:

a recording head for magnetically recording information on a recording medium, a reproducing head for magnetically reproducing information from the recording medium; and heat sources for heating the recording medium when recording and reproducing, the heat sources being provided for the recording head and the reproducing head respectively.

According to the foregoing structure, the heat sources for raising the temperature of the recording medium when recording and reproducing information on and from the recording medium are separately provided for the reproducing head and the recording head respectively, and it is therefore possible to provide each head and a corresponding heat source in close proximity at a shorter distance.

With this arrangement, when recording and reproducing information based on the thermal distribution of the recording medium heated by the heat source, it is not necessary to heat the recording medium excessively in a wide region, and it is therefore possible to suppress a thermal damage on the recording medium. Furthermore, when reproducing by heating a reproducing portion to a predetermined temperature by the reproducing head, such problem that the recording medium is heated too much, and the recorded information is erased can be prevented.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a plan view illustrating an entire structure of a composite magnetic head device mounting the composite magnetic head.

FIG. 10(a) is an explanatory view illustrating the state in which servo pit patterns of two kinds are formed on a recording medium in accordance with one embodiment of the present invention.

FIG. 10(b) is a waveform chart illustrating a sampling signal for use in detecting one of the servo pit patterns of two kinds of FIG. 10(a).

FIG. 10(c) is a waveform chart illustrating a sampling signal for use in the detection of the other one of the servo bit patterns of two kinds of FIG. 10(a).

FIG. 11(a) is an explanatory view illustrating a servo pit pattern proposed for the conventional optical disk.

FIG. 11(b) is a waveform chart illustrating a detection signal when scanning along the trace S of FIG. 11(a).

FIG. 11(c) is a waveform chart illustrating a detection signal when scanning along the trace T of FIG. 11(a).

FIG. 11(d) is a waveform diagram illustrating the detection signal when scanning along the trace U of FIG. 11(a).

FIG. 15(a) is a front view illustrating the schematic structure of the magnetic head device adopted for the laser assisted system.

FIG. 15(b) is a graph illustrating the results of the thermal distribution on the recording medium obtained from a simulation performed with the magnetic head device illustrated in FIG. 15(a) by the laser assisted system.

DESCRIPTION OF THE EMBODIMENTS

[First Embodiment]

Figure 1:
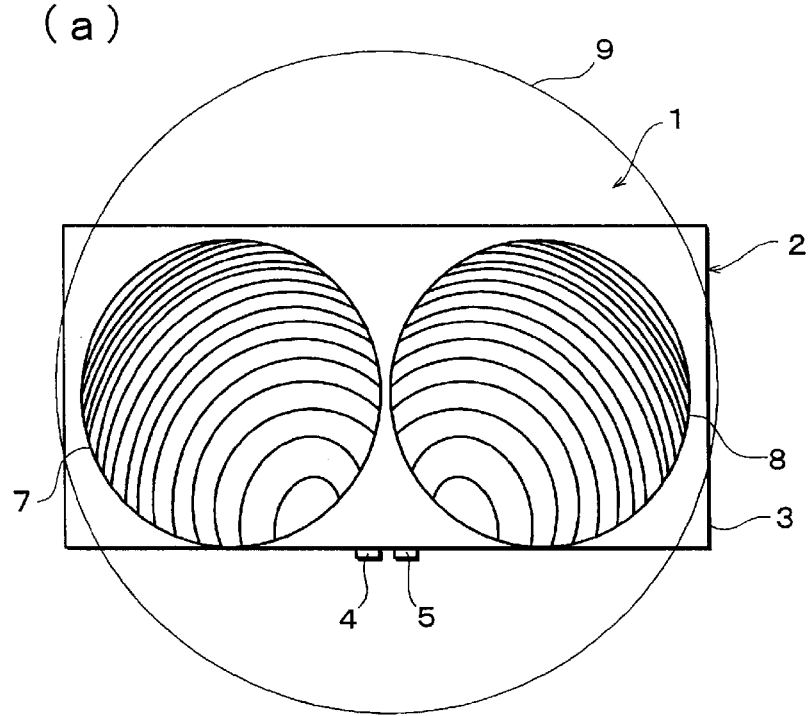
FIG. 1(a) is a plan view illustrating a composite magnetic head in accordance with one embodiment of the present invention.
FIG. 1(b) is a cross-sectional view of the composite magnetic head of FIG. 1(a).
Figure 1:
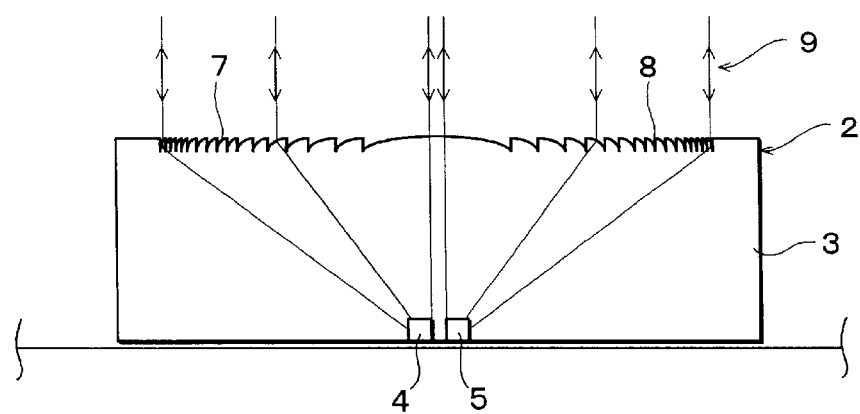
Figure 2:
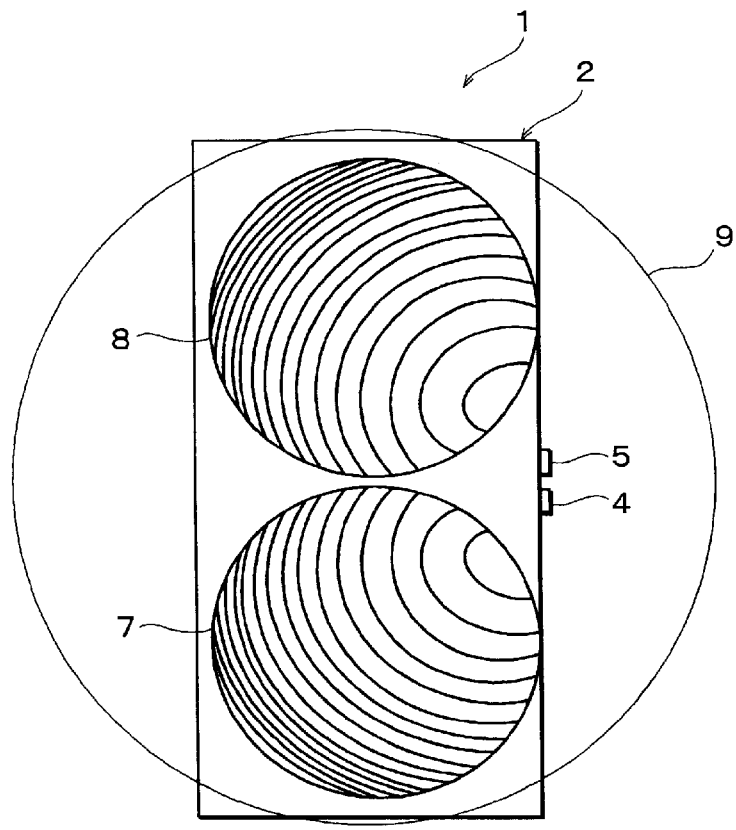
FIG. 2(a) is a plan view showing the positional relationship between the composite magnetic head and a recording medium.
FIG. 2(b) is a cross-sectional view of the composite magnetic head and the recording medium of FIG. 2(a).
Figure 2:
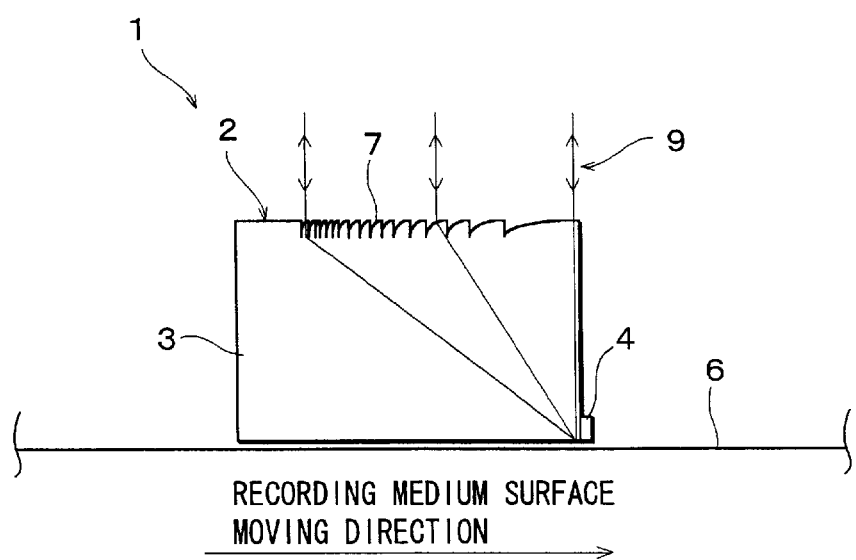
Figure 3:
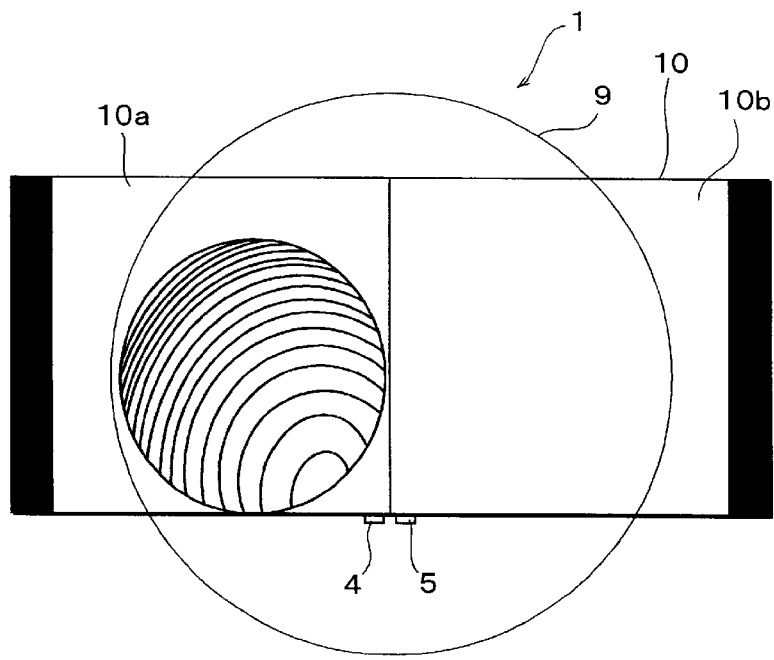
FIG. 3(a) is a plan view illustrating a liquid crystal shutter mounted on the upper surface of the composite magnetic head.
FIG. 3(b) is a cross-sectional view of the composite magnetic head and the liquid crystal shutter of FIG. 3(a).
Figure 3:
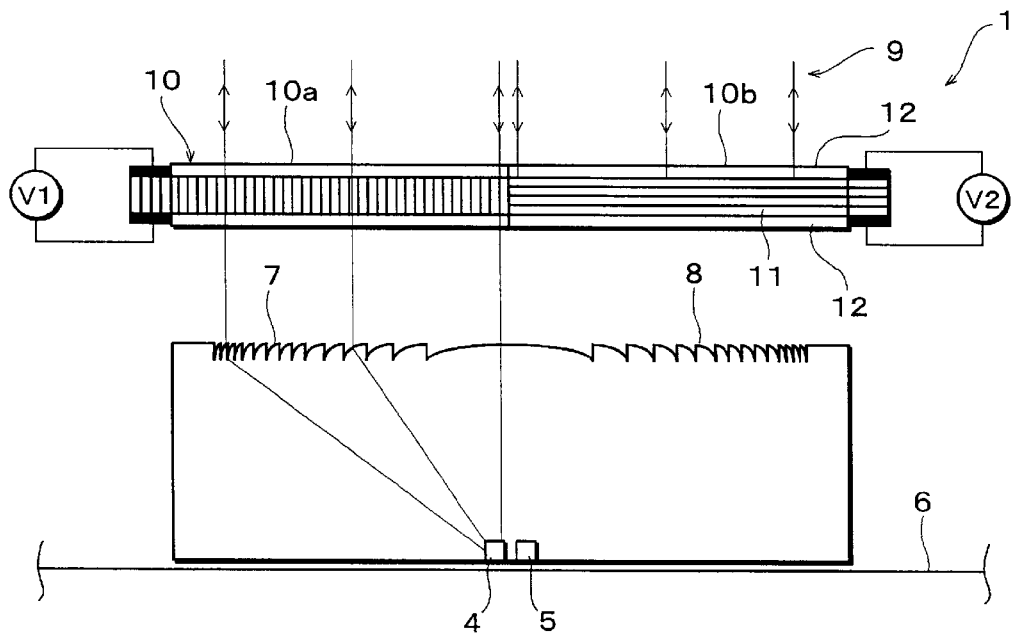

The following descriptions will discuss one embodiment of the present embodiment in reference to FIG. 1(a) through FIG. 7(d).

As illustrated in FIGS. 1(a) and 1(b), a composite magnetic head device 1 of the present embodiment is provided with a composite magnetic head 2. FIG. 1(a) is a plan view illustrating the composite magnetic head 2. FIG. 1(b) is a longitudinal cross-sectional view of the composite magnetic head 2 of FIG. 1(a).

The composite magnetic head 2 includes an objective lens (heat source, focusing means) 3 of rectangular parallelopiped shape, a recording head 4 for use in recording information, such as a thin film inductive magnetic head, etc., and a reproducing head 5 for use in reproducing information such as an MR (magnetoresistance) head or a GMR (giant magnetoresistance) head, etc. The recording head 4 and the reproducing head 5 are attached to the objective lens 3 as one integral part. Specifically, these heads 4 and 5 are aligned in parallel around the center along the bottom line on one of the side surfaces of the objective lens 3. As illustrated in FIGS. 2(a) and 2(b), the recording head 4 and the reproducing head 5 are aligned in a direction orthogonal to the track direction, i.e., the radial direction of the recording medium 6 composed of a magnetic disk when the composite magnetic head 2 makes an access to the recording medium 6. FIGS. 2(a) and 2(b) illustrate the positional relationship of the moving direction of the surface of the recording medium 6, the alignment direction of the recording head 4 and the reproducing head 5, and the light beam spot (to be described later).

On the upper surface of the objective lens 3, formed are a diffraction grating pattern 7 corresponding to the recording head 4, and a diffraction grating pattern 8 corresponding to the reproducing head 5. These two diffraction grating patterns 7 and 8 are formed on the surface of the objective lens 3 in an incident area of one collimated beam 9. When the collimated beam 9 is incident on the composite magnetic head 2 from above, the diffraction grating pattern 7 forms a light beam spot in a vicinity of the recording head 4, while the diffraction grating pattern 8 forms a light beam spot in a vicinity of the reproducing head 5. Therefore, the diffraction grating patterns 7 and 8 function with a collimated beam 9 as heat sources for generating heat when recording and reproducing respectively.

As illustrated in FIGS. 1(a) and 1(b), and FIGS. 2(a) and 2(b), the objective lens 3 produces respective light beam spots in a vicinity of its bottom surface, and functions as an SIL (solid immersion lens). Therefore, for the objective lens 3, a transparent substrate made of silica glass having a diffractive index larger than 1 is adopted, and the numerical aperture (NA) indicative of lens performances of the objective lens 3 is set to not less than 1.

Detailed explanations on various design methods of the diffraction grating patterns 7 and 8 are described, for example, in "Introduction to Diffraction Optical Element" by Optronics, Co. published in 1997. The representative one of those described therein is to utilize the interference fringe at the incident surface of the objective lens 3 between the spherical wave from the focal positions of the two light beam spots and the plane wave incident on the surface of the objective lens 3.

It is preferable that the composite magnetic head 2 be provided with a liquid crystal shutter (heat source control means, light shielding means) 10 on the upper surface of the objective lens 3 as illustrated in FIGS. 3(a) and 3(b).

The liquid crystal shutter 10 is an element of variable light transmittance by varying the alignment of liquid crystal molecules by adjusting an applied voltage to transparent electrodes 12 having a liquid crystal layer 11 sandwiched in between. In the structure of the present embodiment, the liquid crystal shutter 10 functions as a shutter for shielding the objective lens 3 from a light beam, i.e., collimated beam 9.

The liquid crystal shutter 10 includes a region 10a on the recording side corresponding to the diffraction grating pattern 7 for the recording head 4 and a region 10b on the reproducing side corresponding to the diffraction grating pattern 8 for the reproducing head 5. The driving voltage supply means supplies a driving voltage V1 to the region 10a on the recording side and a driving voltage V2 to the region 10b on the reproducing side. The driving voltage supply means is constituted, for example, by a controller 63 illustrated in FIG. 13.

In the structure illustrated in FIGS. 3(a) and 3(b), for example, the driving voltage V1 may be set to 0 V at which the light transmittance in the region 10a on the recording side is maximized, and the driving voltage V2 is set to 5V at which the light transmittance in the region 10b on the reproducing side is substantially zero. In this case, the light beam spot is formed only on the side of the recording head 4, and the light beam spot is not formed on the side of the reproducing head 5. Namely, the liquid crystal shutter 10 is controlled according to an operation mode (recording mode or reproducing mode) of the composite magnetic head 2 to select whether or not to form the light beam spot as a light spot in each operation. In this way, an excessive supply of heat to the recording medium 6 can be avoided, and the thermal damage on the recording medium 6 can be reduced.

Figure 5:
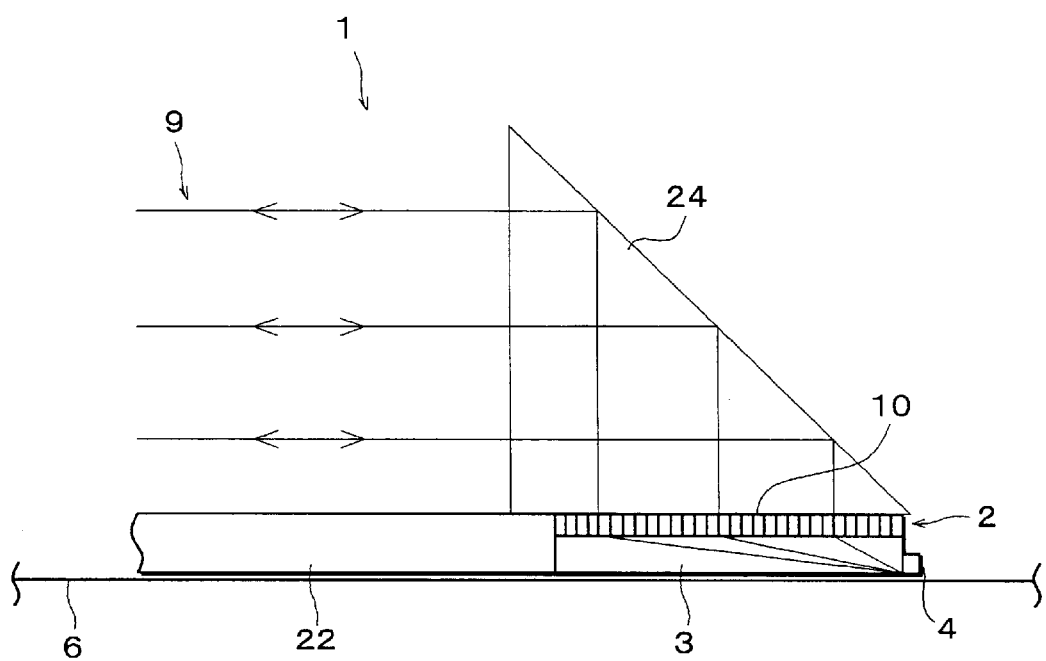
FIG. 5 is a front view illustrating the structure of the composite magnetic head mounting area of the composite magnetic head device of FIG. 4.

The composite magnetic head device 1 includes an actuator 21 with an arm-shaped suspension 22 as illustrated in FIG. 4. To this suspension 22, the composite magnetic head 2 is mounted. Specifically, as illustrated in FIG. 5, to the leading end of the arm-shaped suspension 22, the opposite side of the composite magnetic head 2 to the head mounting side of the objective lens 3 is fixed. Further, the actuator 21 includes a triangular prism 24 formed on the magnetic head 2, for directing to the objective lens 3 a reflected light of the collimated beam 9 travelled in a direction parallel to the suspension 22.

As illustrated in FIG. 4, the actuator 21 is driven by a voice coil 25 provided at the rear end to rotate about an axis 26. With the foregoing structure, the composite magnetic head 2 mounted at the leading end of the suspension 22 moves in an arc in the radial direction of the recording medium 6 with the rotations of the actuator 21, i.e., the suspension 22, thereby scanning the entire surface of the recording medium 6. The recording head 4 and the reproducing head 5 are aligned in the direction orthogonal to the direction of the tracks (not shown) in the circumferential direction of the recording medium 6.

Figure 6:
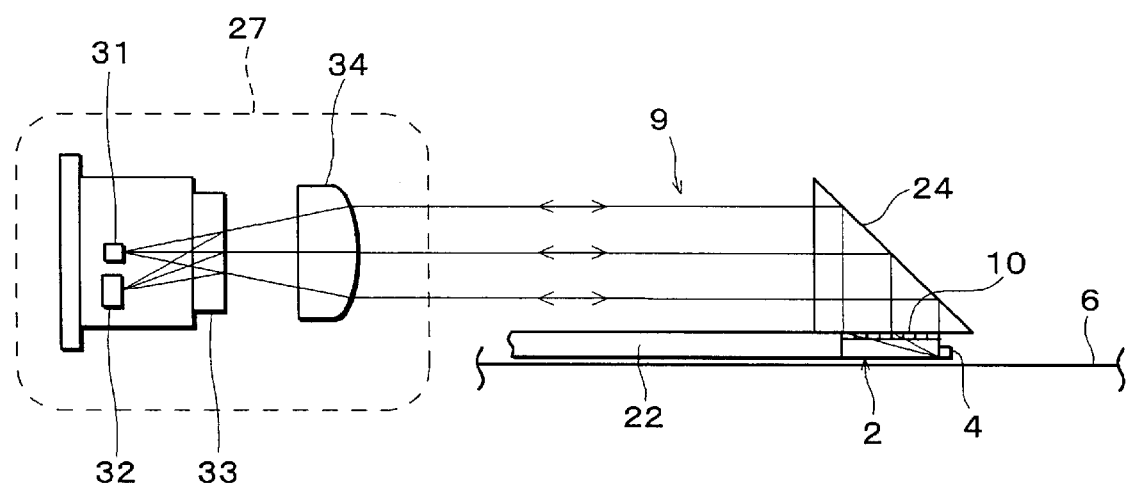
FIG. 6 is an explanatory view illustrating the structure around the optical system of the composite magnetic head device of FIG. 4.
Figure 7:
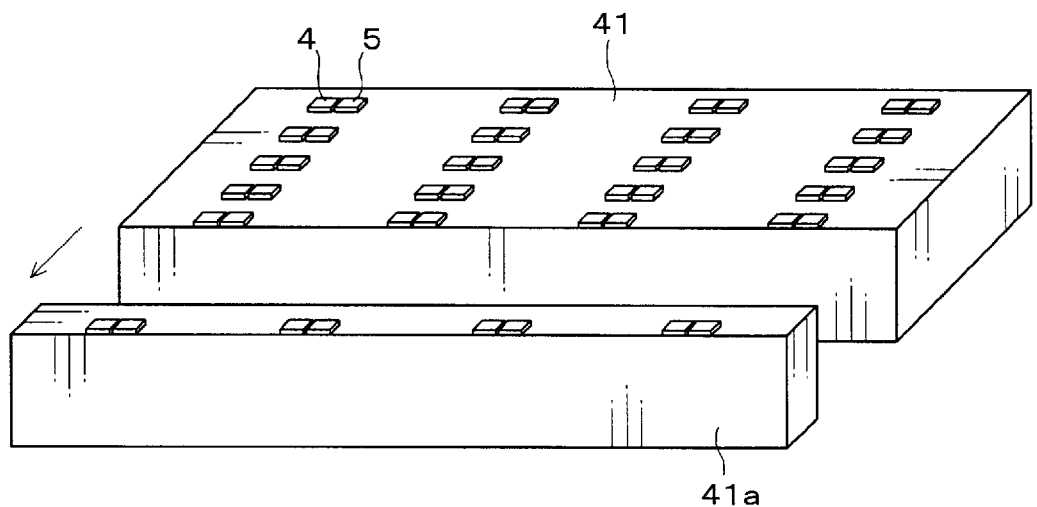
FIG. 7(a) is a perspective view illustrating the processes of forming the recording head and the reproducing head in the manufacturing process of the composite magnetic head.
FIG. 7(b) is a perspective view illustrating the processing of a cut piece of the transparent substrate.
FIG. 7(c) is a perspective view illustrating a process of forming diffraction grating patterns on the cut piece.
FIG. 7(d) is a perspective view illustrating a process of cutting out a composite magnetic head from the cut piece.
Figure 7:
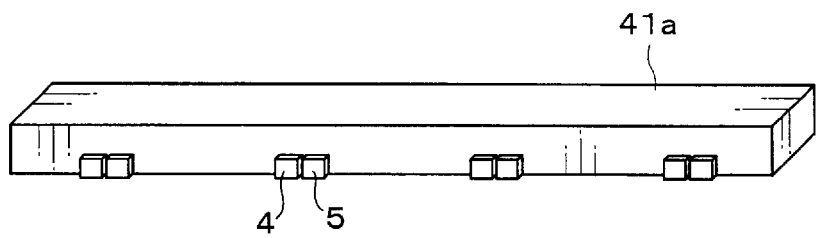
Figure 7:
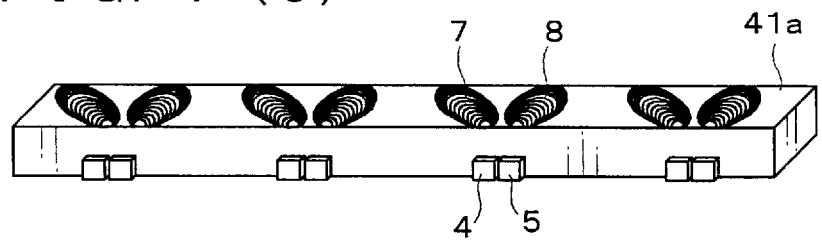
Figure 7:
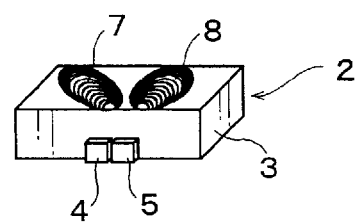

As illustrated in FIG. 4, a laser receiving/emitting section 27 is mounted on the upper surface of the actuator 21. As illustrated in FIG. 6, this laser receiving/emitting section 27 includes a semiconductor laser (heat source, laser emitting means) 31, a photodetector 32, hologram 33 and a collimating lens (collimated beam producing means) 34.

A laser beam emitted from the semiconductor laser 31 is incident on the collimating lens 34 through the hologram 33 to be shaped into the collimated beam 9. Then, the collimated beam 9 is directed to the triangular prism 24 and is further directed to the composite magnetic head 2 by the triangular prism 24 with accuracy. On the other hand, a reflected return beam from the recording medium 6 is incident again onto the collimating lens 34 through the composite magnetic head 2 by the triangular prism 24. Then, the light beam incident on the collimating lens 34 is diffracted by the hologram 33 and is directed to the photodetector 32.

As described, in the foregoing structure of the present embodiment, a light beam spot for the recording head 4 is produced by the semiconductor laser 31, the hologram 33, the collimating lens 34, the triangular prism 24 and the diffraction grating pattern 7. Similarly, a light beam spot for the reproducing head 5 is produced by the same optical system as that of the recording head 4, i.e., the semiconductor laser 31, the hologram 33, the collimating lens 34, and the triangular prism 24, and the diffraction grating pattern 8.

The respective return beams from respective light beam spots for the recording head 4 and the reproducing head 5 are directed to the same photodetector 32.

With the foregoing structure, when recording on the recording medium 6, a laser beam emitted from the semiconductor laser 31 is incident on the liquid crystal shutter 10 of the composite magnetic head 2 via the hologram 33, the collimating lens 34, and the triangular prism 24. In this state, the shutter 10 controls the region 10a on the recording side to be a transmissive state, and the region 10b on the reproducing side to be a shielded state. Therefore, the laser beam is incident only in the diffraction grating pattern 7 of the objective lens 3, and the light beam spot is formed by the diffraction grating pattern 7 in a vicinity of the recording head 4. Then, the recorded portion of the recording medium 6 is heated by the light beam spot to or above Curie temperature, thereby performing recording operation by means of the recording head 4.

On the other hand, when reproducing from the recording medium 6, a laser beam emitted from the semiconductor laser 31 is incident on the liquid crystal shutter 10 of the composite magnetic head 2 via the hologram 33, the collimating lens 34, and the triangular prism 24. In this state, the shutter 10 controls the region 10a on the recording side to be a shielded state, and the region 10b on the reproducing side to be a transmissive state. Therefore, the laser beam is incident only in the diffraction grating pattern 8 of the objective lens 3, and the light beam spot is formed by the diffraction grating pattern 8 in a vicinity of the reproducing head 5. Then, the reproducing portion of the recording medium 6 is heated by the light beam spot to a predetermined temperature, thereby performing reproducing operation by means of the reproducing head 5.

In the laser assisted magnetic recording and reproducing system, the recording medium is heated by a light beam when recording and reproducing information. On the other hand, the conventional magnetic head device is arranged such that a thin film inductive magnetic head for use in reproducing and an MR element or a GMR element for use in reproducing (element utilizing magnetic resistance effect) are laminated as one integral member. Here, the foregoing magnetic head prepared based on the prior art document (2) described earlier will be discussed. The structure of this magnetic head is illustrated FIG. 15(a).

As illustrated in FIG. 15(a), a magnetic head device 111 provided with a thin film dielectric magnetic head 112 and an MR element 113 as one integral member is mounted to a chip of the semiconductor laser 102. With this magnetic head device 111, a recording medium 104 is heated by projecting thereon a laser beam 105 from the semiconductor laser 102, and recording and reproducing are performed based on the thermal distribution on the recording medium 104.

Specifically, in the case of adopting the recording medium 104 whose Curie temperature is around 250° C., in order to record thereon information, the portion irradiated with the laser beam 105 needs to be heated to or above its Curie temperature, i.e., 250° C. On the other hand, when reproducing information from the recording medium 104, the portion irradiated with the laser beam 105 needs to be heated to around 200° C. at which the residual magnetization is maximized.

With this structure, the thermal distribution when projecting the laser beam 105 onto the recording medium 104 for the laser assisted system was obtained by simulation. The result of this simulation is shown in FIG. 15(b). The results show that the temperature of the position only 1 μm behind the position from which the laser beam 105 is projected (in the direction to the moving direction of the recording medium 104) is around 100° C. below the temperature of the laser beam projecting position. In the foregoing conventional magnetic head device 111 (prior art document (2)), the recording head (thin film inductive magnetic head 112) and the reproducing head (MR element 113) are structurally about several μm apart from the laser beam projecting position. Therefore, when performing a reproducing operation from the recording medium 104 by heating the reproducing portion of the recording medium 104 to a predetermined temperature, this portion irradiated with the laser beam may be heated to or above its Curie temperature. As a result, a problem arises in that information recorded on the recording medium 104 is erased.

The foregoing results have proved that it is not possible to perform the laser assisted magnetic recording and reproducing operation by the conventional magnetic head device.

In contrast, according to the composite magnetic head device of the present embodiment, light beam spots can be formed in a vicinity of the recording head 4 and in a vicinity of the reproducing head 5 respectively by the diffraction grating pattern 7 and the diffraction grating pattern 8. Therefore, it is possible to raise the temperature around the recording head 4 and the temperature around the reproducing head 5 to the respective appropriate temperatures, thereby eliminating the likelihood of the foregoing problem.

Next, the method of manufacturing the composite magnetic head 2 will be explained in reference to FIGS. 7(a) to 7(d).

For the material of the objective lens 3, silica glass is used. For the recording head 4 and the reproducing head 5, a thin film inductive head and an MR head are used respectively. The recording head 4 and the reproducing head 5 are manufactured on the plane of a transparent substrate 41 by the known method as described, for example, in "Recording Media Business Hot Line" (Kogyo Chosakai, published in 1997). In this example, the recording head 4 and the reproducing head 5 are prepared independently.

As illustrated in FIG. 7(a), first, a plurality of pairs of the recording head 4 and the reproducing head 5 are formed in a longitudinal direction and a lateral direction in the form of matrix on the upper surface of the transparent substrate 41 made of silica glass.

Then, the transparent substrate 41 is cut into pieces along the alignment direction of the recording heads 4 and the reproducing heads 5 such that these heads 4 and 5 are aligned along the cut line.

Next, as illustrated in FIG. 7(b), the cut piece 41a of the transparent substrate 41 is placed in such a manner that the recording heads 4 and the reproducing heads 5 are mounted on one of the side surfaces so as to be aligned along the bottom line of the side surface. Further, on the upper surface of the cut piece, diffraction grating patterns 7 and 8 corresponding to the recording heads 4 and reproducing heads 5 are formed as illustrated in FIG. 7(c).

In this process of forming the diffraction grating patterns, first, the upper surface of the cut piece 41a is scrubbed, and then photoresist is applied onto the upper surface. Next, a photomask of the diffraction grating patterns 7 and 8, obtained by calculation beforehand are placed in conformity of the positions of the heads 4 and 5 (mask alignment). By this mask alignment, the positioning between the respective positions of the heads 4 and 5 and the respective positions of the light beam spots can be made.

Then, a sequential process of exposure, development, etching, and removal of resist is performed, thereby obtaining the diffraction grating patterns 7 and 8. In this formation of the diffraction grating patterns 7 and 8, the photolithography and the etching are repeated four times, whereby phase gratings of four stages are formed. As a result, the first order diffraction efficiency at a reference wavelength is 81.1 percent.

After forming the diffraction grating patterns 7 and 8, the bottom face of the cut piece 41a, i.e., the objective lens 3 including the heads 4 and 5 was subjected to scrubbing. In this case, the transparent substrate of the objective lens 3 itself serves as a slider.

Thereafter, as illustrated in FIG. 7(d), the cut piece 41a is further cut into smaller pieces for each pair of the recording head 4 and the reproducing head 5, thereby obtaining a composite magnetic head 2.

As described, according to the composite magnetic head device 1 of the present embodiment, a light beam spot is formed in a vicinity of the recording head 4 or the reproducing head 5 by converging the laser beam onto the diffraction grating pattern 7 or the diffraction grating pattern 8, thereby performing recording and reproducing operations on and from the recording medium by the laser assisted system.

Therefore, when recording only the recording portion and its vicinity can be heated to an appropriate temperature for recording, while when reproducing, only the reproducing portion and its vicinity can be heated to an appropriate temperature for reproducing. As a result, such problem when heating the reproducing portion of the recording medium 6 that the reproducing portion is heated too much and the information recorded in the heated portion is erased can be prevented. Moreover, recording and reproducing operation can be performed using a laser beam of low intensity.

The composite magnetic head device 1 of the present embodiment is provided with the liquid crystal shutter 10 which permits only the light beam spot for recording to be formed when recording, while only the light beam spot for reproducing to be formed when reproducing. Therefore, the recording medium 6 can be prevented from being heated too much, and thus a thermal damage on the recording medium 6 can be suppressed.

[Second Embodiment]

Figure 8:
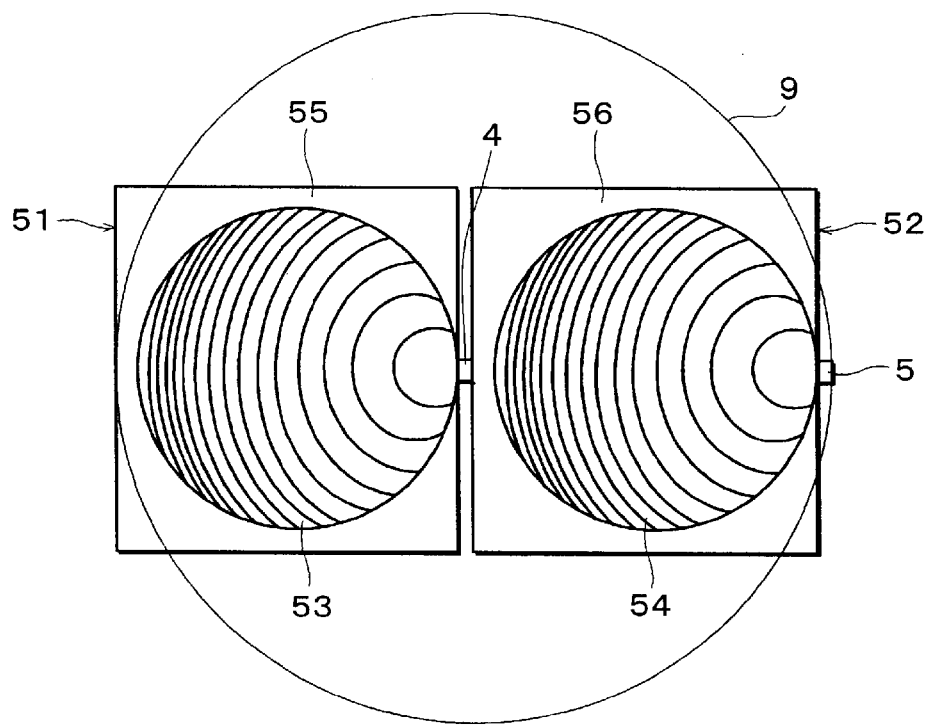
FIG. 8(a) is a plan view illustrating a composite magnetic head in accordance with another embodiment of the present invention.
FIG. 8(b) is a cross-sectional view of the composite magnetic head of FIG. 8(a).
Figure 8:
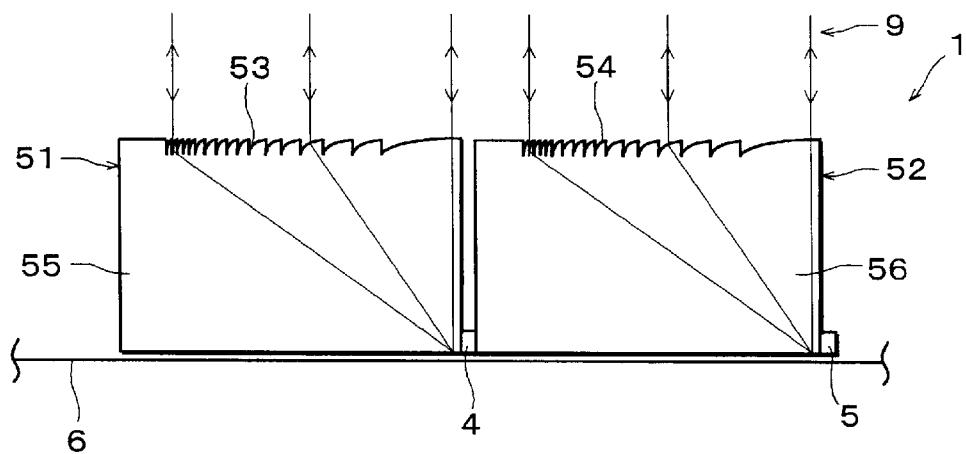
Figure 9:
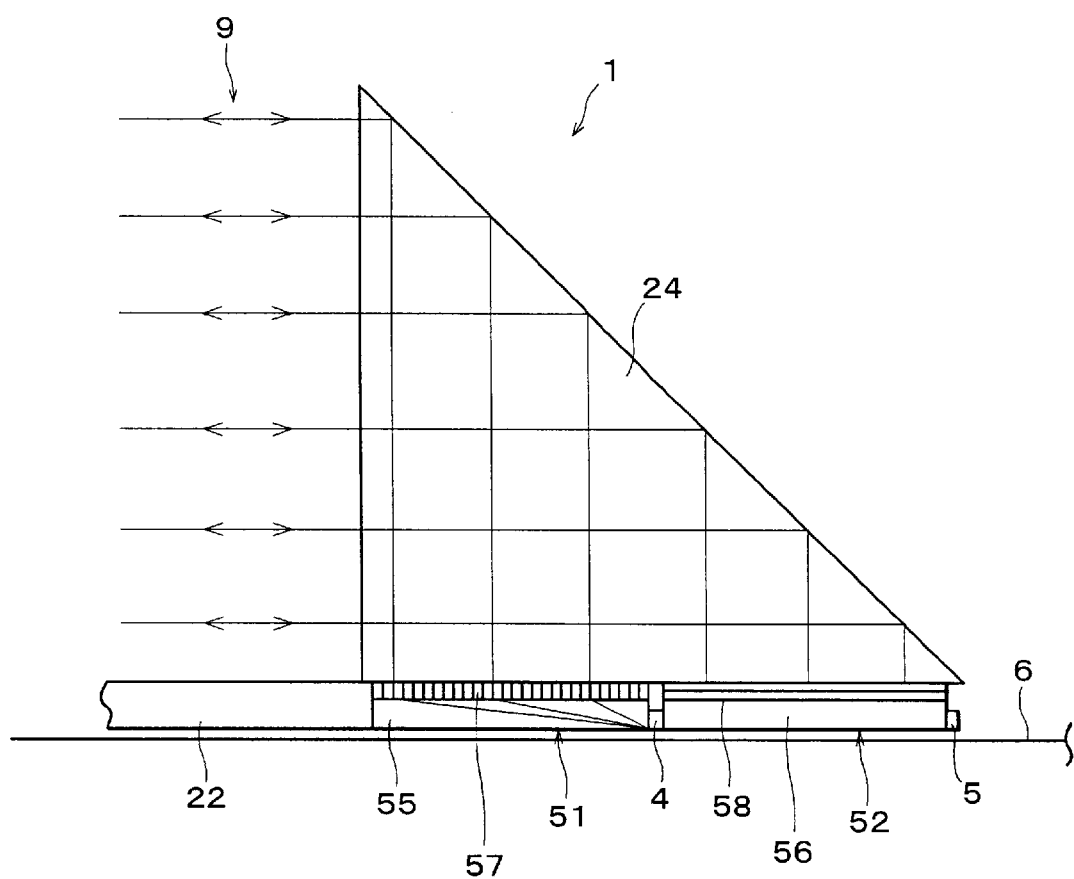
FIG. 9 is a front view illustrating the structure around the composite magnetic head mounting area of the composite magnetic head device of FIGS. 8(a) and 8(b).
Figure 12:
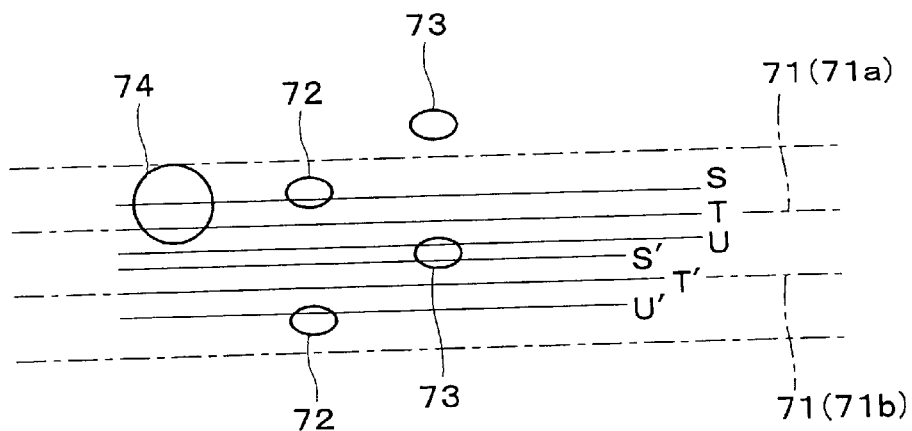
FIG. 12(a) is an explanatory view illustrating a servo pit pattern proposed earlier by the inventors of the present invention as a basis for the present invention.
FIG. 12(b) is a waveform chart illustrating a detection signal when scanning along the traces S, U' of FIG. 12(a).
FIG. 12(c) is a waveform chart illustrating a detection signal when scanning along the traces T, T' of FIG. 12(a).
FIG. 12(d) is a waveform diagram illustrating the detection signal when scanning along the traces U, S' of FIG. 12(a).
Figure 12:
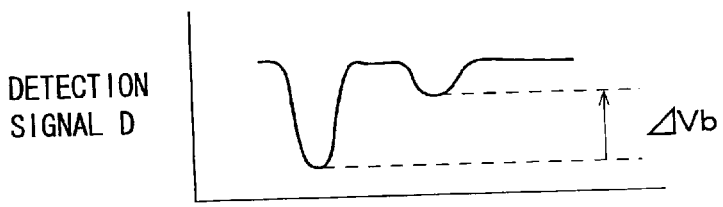
Figure 12:
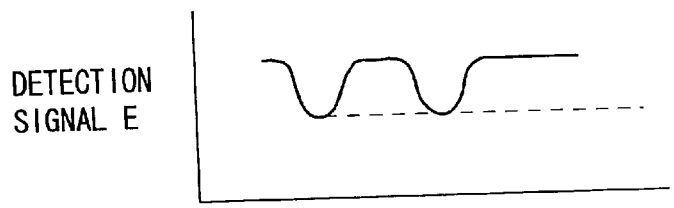
Figure 12:
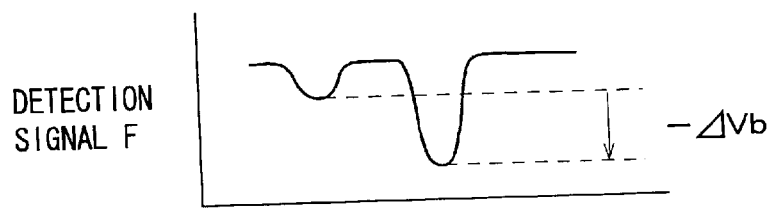

The following descriptions will discuss another embodiment of the present invention in reference to FIGS. 8(a), 8(b) and 9. For ease of explanation, members (structures) having the same functions as those shown in the drawings pertaining to the first embodiment above will be given the same reference symbols, and explanation thereof will be omitted here.

A composite magnetic head device 1 of the present embodiment adopts composite magnetic heads 51 and 52 illustrated in FIGS. 8(a) and 8(b) in replace of the composite magnetic head 2 of the first embodiment. FIG. 8(a) is a plan view illustrating the composite magnetic heads 51 and 52, and FIG. 8(b) is a longitudinal cross-sectional view of the composite magnetic heads 51 and 52 of FIG. 8(a).

The composite magnetic head 51 includes an objective lens (heat source, focusing means) 55 having a diffraction grating pattern 53 formed on its upper surface, and a recording head 4 which are provided as one integral part. Similarly, the composite magnetic head 52 includes an objective lens (heat source, focusing means) 56 having a diffraction grating pattern 54 formed on its upper surface, and a reproducing head 5 which are provided as one integral part.

The objective lens 55 and 56 have the same rectangular parallelopiped shape, and the diffraction grating patterns 53 and 54 are of the same pattern. The recording head 4 and the reproducing head 5 are provided on the side surfaces on the same side around the centers along the bottom lines of the objective lens 55 and 56 respectively. As in the case of the composite magnetic head 2, the diffraction grating patterns 53 and 54 respectively form light spots in a vicinity of the recording head 4 and in a vicinity of the reproducing head 5.

The composite magnetic heads 51 and 52 are arranged in parallel in such a manner that the respective side surfaces having formed thereon the recording head 4 and the reproducing head 5 are placed in the same direction, so that the recording head 4 is positioned between the objective lens 55 and the objective lens 56. These composite magnetic heads 51 and 52 are aligned in parallel in the track direction of the recording medium 6.

With this structure, when the collimated beam 9 is incident onto the composite magnetic head 51 from above, a light beam spot is formed in a vicinity of the recording head 4 by the diffraction grating pattern 53, and the light beam spot is used as a heat source for recording. Similarly, when a collimated beam is incident on the composite magnetic head 52 from above, a light beam spot is formed in a vicinity of the reproducing head 5 by the diffraction grating pattern 54, and this light beam spot is used as a heat source for reproducing.

As illustrated in FIG. 9, the composite magnetic heads 51 and 52 are mounted to the leading end of the suspension 22. The composite magnetic head 51 includes a liquid crystal shutter (heat source control means, light shielding means) 57 formed on the objective lens 55. The composite magnetic head 52 includes a liquid crystal shutter (heat source control means, light shielding means) 58 formed on the objective lens 56. The liquid crystal shutters 57 and 58 correspond to the region 10a on the recording side and the region 10b on the reproducing side of the liquid crystal shutter 10, and the operations of these shutters are controlled in the same manner as the regions 10a and 10b.

The composite magnetic head device of the present embodiment includes a triangular prism 24 formed on the composite magnetic heads 51 and 52, and a laser receiving/emitting section 27 of the same structure as those of the first embodiment.

The composite magnetic heads 51 and 52 can be produced by the method of the composite magnetic head 2. However, in addition to the manufacturing process of the composite magnetic head 2, the step of cutting the recording head 4 and the objective lens 55, and the reproducing head 5 and the objective lens 56 separately, and bonding the resulting cut pieces in the track direction is needed.

As described, according to the composite magnetic head device 1 of the present embodiment, it is possible to perform the positioning of the recording head 4 and the reproducing head 5 along the same track. Therefore, an operation can be performed on the system in an efficient manner, and the foregoing arrangement is suited for executing such verify function that immediately after recording information, the information is reproduced.

[Third Embodiment]

The following descriptions will discuss still another embodiment of the present invention in reference to FIGS. 10(a) through 13. For ease of explanation, members (structures) having the same functions as those shown in the drawings pertaining to the first embodiment above will be given the same reference symbols, and explanation thereof will be omitted here.

An information recording and reproducing device in accordance with the present embodiment adopts the above explained composite magnetic head device 1. The information recording and reproducing device 1 performs a tracking servo based on reflected light beams from the recording medium 6 of respective light beam spots for use as heat sources of the recording head 4 and the reproducing head 5 respectively. Namely, the positional information of the composite magnetic head 2 is obtained from the reflected light beams. Although either of the composite magnetic head 2 and the composite magnetic heads 51 and 52 are applicable to the foregoing information recording and reproducing device, in the present embodiment, explanations will be given through the case of adopting the composite magnetic head 2.

Since the composite magnetic head 2 is provided with the recording head 4 and the reproducing head 5 independently, the tracking of the recording head 4 when recording and the tracking of the reproducing head 5 when reproducing are needed respectively. Therefore, in order to reproduce recorded information by accurately scanning the tracks whereon the information are recorded, the tracking of the recording head 4 and the tracking of the reproducing head 5 need to be executed based on the same positional information. Therefore, as illustrated in FIG. 10(a), the recording medium 6 is arranged such that the positional information of recessed and projected pits (servo pits) for use in servo are formed beforehand. Further, based on changes in amounts of reflected light beams from these pits, the relative positional relationship between the respective heads 4 and 5 and the track 71 is obtained.

FIG. 11(a) illustrates an example of servo pits of the sample servo proposed in the conventional optical disk. On one side of each track 71, formed is first servo pits 72, and on the other side of the track 71, formed is a second servo pit 73. The first servo pit 72 and the second servo pit 73 are formed in the tracking direction in this order.

A recording medium of the conventional structure (servo pit width: 0.1 μm, servo pit length: 0.2 μm, and a track pitch: 0.3 μm) was prepared, and with respect to this recording medium, an experiment on the detection sensitivity of the servo signal was performed. In this experiment, the light beam spot 74 having a diameter of 0.3 μm of a blue purple laser beam having a wavelength of 410 nm is adopted. For the optical system, the composite magnetic head device 1 illustrated in FIG. 6 is adopted.

As a result, detection signals A to C as illustrated in FIGS. 11(b) to 11(d) were obtained by the photodetector 32. The detection signal A was obtained as an output when the light beam spot 74 scanned the trace S (off track position), the detection signal B was obtained as an output when the light beam spot 74 scanned the trace T (just track position), and the detection signal C was obtained as an output when the light beam spot 74 scanned the trace U (off track position).

As can be seen from these detection signals A to C, a shift amount of the light beam spot 74 from the predetermined track 71 can be obtained from the level difference ΔVa between i) the initial bottom peak value obtained from the first servo pit 72 of the detection signal outputted from the photodetector 32 and ii) the next bottom peak value obtained from the second servo pit 73. Namely, when the light beam spot 74 scans the track 71 precisely, the level difference ΔV should be zero. Therefore, the positioning of the light beam spot 74 be controlled so as to satisfy the condition of the level difference ΔVa=0.

The level difference ΔVa indicates the sensitivity of the tracking servo. Therefore, in order to realize the high precision servo control, it is required to output the level difference ΔVa as a large value for the same shift amount of the light beam spot 74 from the predetermined track 71. However, with the arrangement of the servo pits illustrated in FIG. 11(a), a large output value for the level difference ΔVa could not be obtained.

Further, the cause of the foregoing result has found to be the following. That is, when the light beam spot 74 scanned the trace S, at a point the light beam spot 74 passes the second servo pit 73, the output level is reduced too much as being affected by the second servo pit 73 corresponding to the adjacent track 71, and therefore, it is not possible to obtain a large output value for the level difference ΔVa.

In order to overcome the foregoing problem, the inventors of the present application proposed the servo pit pattern illustrated in FIG. 12(a) earlier. Specifically, the servo pit pattern is arranged such that only either one of the first servo pit 72 or the second servo pit 73 is formed between the adjacent tracks 71 such that the first servo pit 72 and the second servo pit 73 are alternately formed in respective spacings between the tracks 71. With the foregoing arrangement of the first servo pits 72 and the second servo pits 73, a distance between the adjacent servo pits 72 and 73 can be increased. Then, the detection sensitivity of the servo signal was tested with respect to the recording medium of the foregoing structure, and detection signals D to F were obtained as illustrated in FIGS. 12(b) through 12(d). This experiment was performed under the same conditions as the previous experiment as to the servo pit size, the light beam spot 74 and the optical system.

The detection signal D was obtained as an output when the light beam spot 74 scanned the traces S and U' (off track position), the detection signal E was obtained as an output when the light beam spot 74 scanned the traces T and T' (just track position), and the detection signal F was obtained as an output when the light beam spot 74 scanned the traces S and U' (off track position).

As can be seen from the detection signals D to F, the foregoing structure offered the level difference ΔVa indicative of the shift amount of the light beam spot 74 from the predetermined track 71, which is more than twice as high as that of the conventional structure, which proved that detection sensitivity was significantly improved.

However, the foregoing structure of FIG. 12(a) has the following problem. That is, for example, in the case where the light beam spot 74 deviates from the track 71b towards the track 71a adjacent to the track 71b, while scanning the track 71a, the light beam spot 74 approaches the first servo pit 72; on the other hand, while scanning the track 71b, the light beam spot 74 moves away from the first servo pit 72. Namely, even when the light beam spot 74 deviates in the same direction, the state of the detection signal is reversed between the track 71a and the track 71b.

This causes a problem that the direction of controlling a servo operation needs to be reversed for every track, which is undesirable for the drive unit.

In response, extensive studies have been made by the inventors of the present application to find out a solution to the foregoing problem. As a result, the servo pit pattern as illustrated in FIG. 10(a) was invented. With the structure of the servo pit pattern of FIG. 10(a), the track 71 is divided into plural servo/data regions 77, each servo/data region 77 being composed of a pair of the servo pit region 75 and the data region 76 adjacent to the servo pit region 75. In the servo pit regions 75, servo pit patterns of two kinds are formed alternately. In these two servo pit patterns, the positional relationship between the first and second servo pits 72 and 73 and corresponding tracks 71 is reversed as illustrated in FIG. 10(a).

Namely, in each servo bit region 75, only either one of the first servo pit 72 or the second servo pit 73 is formed between the adjacent tracks 71, and both of the first servo pits 72 and the second servo pits 73 are formed every other track respectively so that the first servo pits 72 and the second servo pits 73 are formed alternately. Further, between the two adjacent servo pit regions 75(M) and 75(M+1), the first servo pits 72 and the second servo pits 73 are formed in different tracks. Therefore, in one track 71, the first servo pits 72 and the second servo pits 73 are formed alternately.

In other words, the servo patterns include a first servo pattern and a second servo pattern, and the first servo pattern includes i) a first servo pit string (a string of first servo pits 72) of a plurality of servo pits (first servo pits 72) aligned in a direction orthogonal to a track direction in which a servo pit is formed in every other track, and ii) a second servo pit string (a string of second servo pits 73) of a plurality of servo pits (second servo pits 73) aligned in the direction orthogonal to the track direction in which a servo pit is formed in every other track but alternately with the servo pits of the first servo pit string; and the second servo pattern includes a first servo pit string and a second servo pit string which are formed in reverse order in the track direction from the first servo pit pattern.

With the foregoing structure, when scanning the track 71(N), a tracking servo is performed using signals detected by every other servo pit region, i.e., M, M+2, ... When scanning the track 71(N+1) adjacent to the track 71(N), a tracking servo is performed using signals detected by every other servo pit region M+1, M+3, ..., shifted by one servo pit region from the servo pit regions M, M+2, ... used for the scanning of the track 71(N). By switching the servo pit region 75 subjected to the detection for each track 71 to be scanned, the tracking servo can be executed seamlessly.

FIGS. 10(b) and 10(c) show waveforms of the signals of two kinds A and B for use in detecting the first servo pit 72 and the second servo pit 73 respectively. Both of the sampling signals A and B are always produced by the sampling signal supply circuit (now shown), and are outputted therefrom. With the selective use of the foregoing sampling signals A and B, the servo pit patterns of two kinds can be used selectively.

The address information for use in the identification of tracks 71 are formed on the recording medium 6 beforehand as recessed and projected pits, and the address information are read based on changes in amounts of reflected light beams from these pits. Further, a selection is made between the sampling signals A and B according to the address information.

Figure 13:
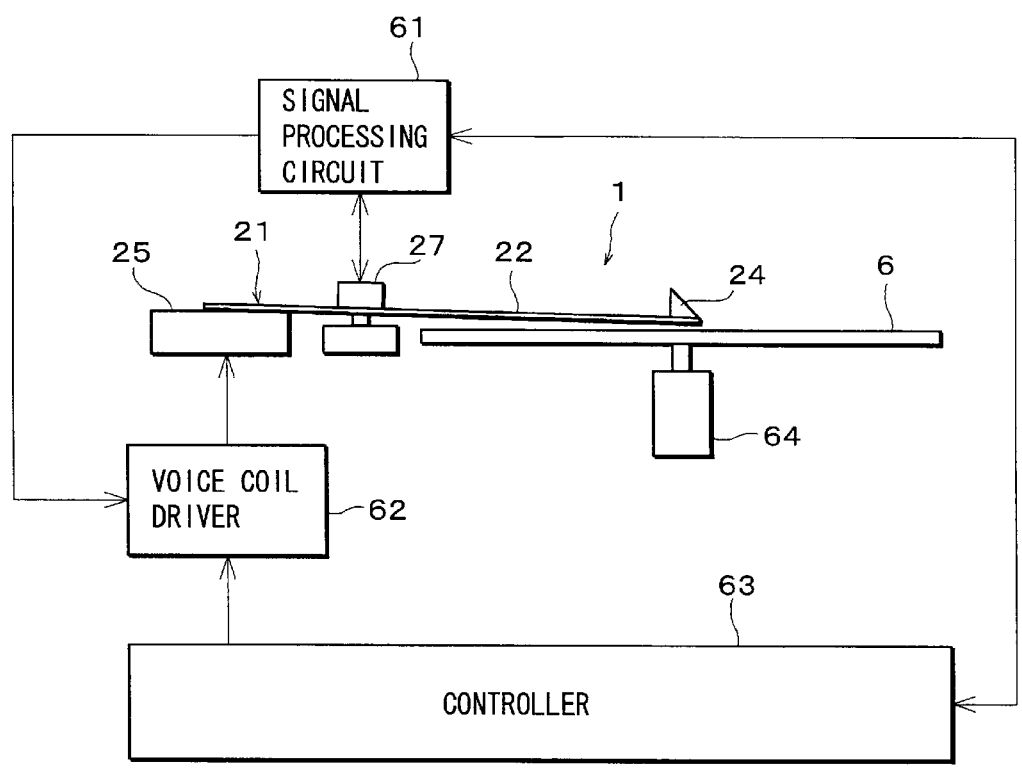
FIG. 13 is a block diagram illustrating a schematic structure illustrating a tracking servo circuit of the information recording and reproducing device in accordance with one embodiment of the present invention.
Figure 14:
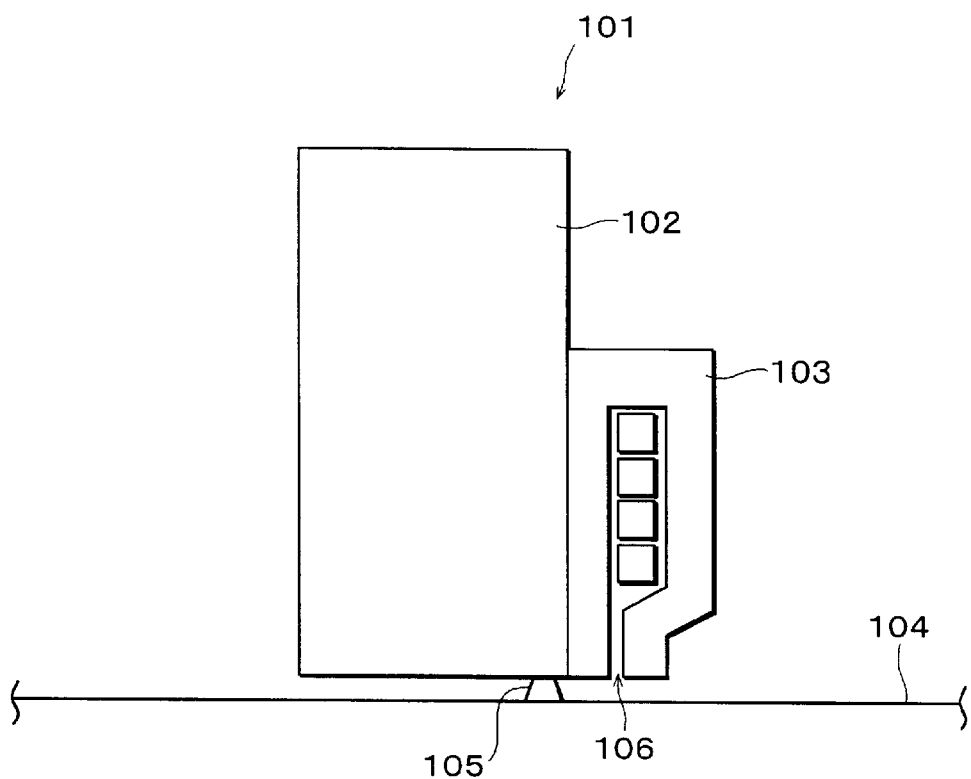
FIG. 14 is a front view illustrating the schematic structure of the magnetic head device adopted in the conventional magnetic recording system.

The information recording and reproducing device in accordance with the present embodiment adopts the composite magnetic head device 1, and is provided with a tracking servo circuit (tracking control means) which performs a tracking servo. The schematic structure of the information recording and reproducing device is illustrated in FIG. 13. The recording medium 6 is rotated by a spindle motor 64, for example, at 5400 rpm.

The tracking servo circuit includes a signal processing circuit 61, a voice coil driver 62 and a controller 63.

The signal processing circuit 61 receives a reproduced signal from the reproducing head 5, and transfers recording information to the recording head 4. The signal processing circuit 61 controls the semiconductor laser 31 in the laser receiving and emitting section 27, and the liquid crystal shutter 10. Further, the signal processing circuit 61 produces tracking servo control signals based on the servo pit information of the recording medium 6 at the light beam spot.

The voice coil driver 62 controls the entire composite magnetic head device 1 according to the control signal for use in tracking servo from the signal processing circuit 61, and performs a scanning of a track of the recording medium 6.

The controller 63 produces two sampling signals A and B illustrated in FIGS. 10(b) and 10(c), and selects one sampling signal corresponding to the track to be scanned, to be supplied to the signal processing circuit 61. The address information of the tracks are read based on the light beam spots like the servo pits, and the address information as read are inputted to the controller 63. In this way, the controller 63 can recognize the address information of the tracks when recording and reproducing.

For example, when recording information on the recording medium 6, with a given instruction from the controller 63, the signal processing circuit 61 controls the liquid crystal shutter 10 mounted to the composite magnetic head 2, so as to shield the objective lens 3 from a laser beam to prevent the formation of a light beam spot as a heat source of the reproducing head 5. As a result, only a light beam spot for the recording head 4 is formed on the recording medium 6, and thus, only the detection signal of the servo pit from this light beam spot can be obtained from the photodetector 32. As a result, it is possible for the recording head 4 to scan the track as desired using the tracking servo control signal obtained from this detection signal.

On the other hand, when reproducing information from the recording medium 6, with a given instruction from the controller 63, the signal processing circuit 61 controls the liquid crystal shutter 10 mounted to the composite magnetic head 2, so as to shield the objective lens 3 from a laser beam to prevent the formation of a light beam spot as a heat source of the recording head 4. As a result, only a light beam spot for the reproducing head 5 is formed on the recording medium 6, and thus, only the detection signal of the servo pit from this light beam spot can be obtained from the photodetector 32. As a result, it is possible for the reproducing head 5 to scan the track as desired using the tracking servo control signal obtained from this detection signal.

As described, by adopting the composite magnetic head device 1 of the present invention, the one-sided recording and reproducing operation can be performed even when adopting the magnetically recording and reproducing system, and therefore, the foregoing structure is advantageous in terms of compactness, mass productivity and large capacity. According to the information recording and reproducing device and the recording medium of the present invention, the tracking servo adopting the composite magnetic head device 1 of the optically assisted system can be performed with high accuracy.

As described, the information recording and reproducing method of the present invention adopting the foregoing composite magnetic head is arranged such that when recording information, the heat source for the reproducing head is inactivated, while when reproducing information, the heat source for the recording head is inactivated.

The information recording and reproducing method of the present invention adopting the foregoing composite magnetic head is also arranged such that a tracking operation is controlled based on the information obtained from the light beam spot.

The composite magnetic head of the present invention may be arranged such that the heat source includes:

laser emitting means for emitting a laser beam, and focusing means for focusing the laser beam emitted from the laser emitting means to form a light beam spot.

According to the foregoing structure, the light source can be obtained with ease, and the light beam spot can be formed by the focusing means at position as desired, i.e., the recording portion by the recording head and the reproducing portion by the reproducing head. It is therefore possible to heat the recording medium to a more appropriate temperature.

The foregoing composite magnetic head may be further arranged such that the laser emitting means is one laser emitting means, and the focusing means forms two light beam spots from the laser beams emitted from the one laser emitting means.

According to the foregoing structure, the focusing means forms two light beam spots from the laser beams emitted from the one laser emitting means. It is therefore possible to reduce the number of laser emitting means, which in turn reduces an overall number of components, thereby realizing the composite magnetic head device of a simplified structure.

The composite magnetic head device may be arranged such that the focusing means is composed of an objective lens, and the recording head and the reproducing head are mounted to the objective lens.

According to the foregoing structure, the focusing means is composed of an objective lens, the recording head and the reproducing head are amounted to the objective lens, and further, at least a pair of the recording head and the objective lens, and a pair of the reproducing head and the objective lens are formed as one integral parts respectively. It is therefore possible to adjust respective positions of the light beam spots to be formed by the objective lens with respect to the recording position and reproducing position by the recording head and the reproducing head with ease.

The composite magnetic head device may be arranged such that the focusing means includes a diffraction grating.

According to the foregoing structure, the focusing means can be formed with ease. Namely, the focusing means may be formed using silica glass as a base material by dry etching using photolithography technology. The focusing means of the foregoing structure can be formed with ease by forming the recording head such as a thin film dielectric magnetic head, and the reproducing head such as magnetoresistance effect sensor head on the silica glass, and then adjusting the respective focal positions of the lens relative to the positions of the recording head and the reproducing head by adjusting the positions of the photomask, as the diffraction gratings can be formed later.

The composite magnetic head device of the present invention may be arranged so as to include:

heat source control means for controlling the heat sources for the recording head and the reproducing head respectively in such a manner that when recording the heat source for the reproducing head is inactivated, while when reproducing the heat source for the recording head is inactivated.

With this structure, when recording and reproducing with respect to the recording medium, the recording medium can be prevented from being heated too much, and thus the thermal damage on the recording medium can be suppressed.

The composite magnetic head device may be arranged so as to include:

shielding means for shielding the focusing means from a light beam to be formed into a light beam spot for the reproducing head when recording, while shielding the focusing means from a light beam to be formed into a light beam spot for the recording head when reproducing.

According to the foregoing structure, by the shielding means, when recording, the formation of unnecessary light beam spot such as a light beam spot for the reproducing head can be prevented, and when reproducing, the formation of unnecessary light beam spot such as a light beam spot for the recording head can be prevented.

With this structure, when recording and reproducing with respect to the recording medium, the recording medium can be prevented from being heated too much, and thus it is possible to suppress the thermal damage on the recording medium.

The composite magnetic head device of the present invention is arranged so as to include:

a recording head for magnetically recording information on a recording medium;

a reproducing head for magnetically reproducing information from the recording medium; and an objective lens to which the recording head and the reproducing head are mounted, the objective lens including a diffraction grating for the recording head for use in forming a light beam spot for the recording head by focusing an incident laser beam, and a diffraction grating for the reproducing head for use in forming a light beam spot for the reproducing head by focusing an incident laser beam.

According to the foregoing structure, when recording information on the recording medium, a light beam spot is formed by the diffraction grating for the recording head of the objective lens, and the recording medium is heated by the resulting light beam spot. On the other hand, when reproducing information from the recording medium, a light beam spot is formed by the diffraction grating for the reproducing head of the objective lens, and the recording medium is heated by the resulting light beam spot. It is therefore possible to heat the recording medium to respective appropriate temperatures according to the recording head and the reproducing head. With this structure, it is not necessary to heat the recording medium excessively in a large area, and therefore, it is possible to suppress the thermal damage on the recording medium. Moreover, when reproducing information by heating the reproducing portion to a predetermined temperature by the reproducing head, the likelihood of such problem that the reproducing portion is heated too much, and the information recorded on the recording medium are erased can be prevented.

The information recording and reproducing device of the present invention may be arranged so as to include:

the foregoing composite magnetic head device, and tracking control means for controlling a tracking operation based on information obtained from a reflected light of the light beam spot from the recording medium.

According to the foregoing structure, a tracking operation can be controlled using the light beam spots for heating the recording medium when recording and reproducing respectively. Therefore, even when adopting the separately provided recording head and the reproducing head, the tracking operation can be controlled with ease. For example, the tracks in which information are recorded by the recording head can be scanned by the reproducing head with accuracy.

The recording medium of the present invention having recorded thereon a servo pattern for controlling tracking beforehand in a form of servo pits is arranged such that:

servo patterns of at least two kinds respectively corresponding to different tracks are formed alternately in a track direction.

According to the foregoing structure, even for tracks of small track pitch, the positional information when the light beam spot passes the servo pit can be obtained with accuracy, and it is therefore possible to perform a tracking operation with high precision even for the information recorded at higher density in the track direction. According to the information recording and reproducing apparatus adopting the foregoing recording medium, by selectively using the servo patterns of at least two kinds, for example, between the adjacent tracks, a tracking operation can be performed seamlessly without reversing the servo polarity on the servo circuit.

The recording medium of the foregoing structure may be arranged such that:

the servo patterns include a first servo pattern and a second servo pattern, and the first servo pattern includes i) a first servo pit string of a plurality of servo pits aligned in a direction orthogonal to the track direction in which a servo pit is formed in every other track, and ii) a second servo pit string of a plurality of servo pits aligned in the direction orthogonal to the track direction in which a servo pit is formed in every other track but alternately with the servo pits of the first servo pit string, and the second servo pattern includes a first servo pit string and a second servo pit string which are formed in reverse order in the track direction from the first servo pit pattern. According to the foregoing structure, using the servo pits of the respective first servo pit strings and the second servo pit strings of the first servo pattern and the second servo pattern, a tracking operation can be performed for each track desirably.

The information recording and reproducing device of the present invention adopting the foregoing recording medium is arranged so as to include tracking control means for controlling a tracking operation by switching to a servo pattern corresponding to the track when scanning each track.

According to the foregoing structure, with respect to the foregoing recording medium, a tracking operation can be controlled appropriately by the tracking control means.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A composite magnetic head, comprising:

a recording head for magnetically recording information on a recording medium, a reproducing head for magnetically reproducing information from said recording medium; and heat sources for heating said recording medium when recording and reproducing, said heat sources being provided for said recording head and said reproducing head respectively.

2. The composite magnetic head as set forth in claim 1, wherein each of said heat sources includes:

laser emitting means for emitting a laser beam, and focusing means for focusing the laser beam emitted from said laser emitting means to form a light beam spot.

3. The composite magnetic head as set forth in claim 2, wherein:

said laser emitting means is one laser emitting means, and said focusing means forms two light beam spots from the laser beams emitted from said one laser emitting means.

4. The composite magnetic head as set forth in claim 2, wherein:

said focusing means is composed of an objective lens, and said recording head and said reproducing head are mounted to said objective lens.

5. The composite magnetic head as set forth in claim 4, wherein:

said recording head and said reproducing head are mounted to said objective lens so as to be aligned in a direction orthogonal to a track direction of the recording medium.

6. The composite magnetic head as set forth in claim 2, wherein:

said objective lens has a diffraction grating.

7. The composite magnetic head as set forth in claim 3, further comprising:

collimated beam producing means for producing the laser beam emitted from said laser emitting means into a collimated beam, said focusing means includes two diffraction gratings, one for said recording head and the other for said reproducing head, and said two diffraction gratings are formed in an incident area on said focusing means in which one collimated beam produced by said collimated beam forming means is projected.

8. The composite magnetic head as set forth in claim 1, wherein:

said focusing means is composed of an objective lens for said recording head and an objective lens for said reproducing head, and said recording head is mounted to said objective lens for said recording head, and said reproducing head is mounted to said objective lens for said reproducing head.

9. The composite magnetic head as set forth in claim 8, wherein:

said objective lens for said recording head and said objective lens for said reproducing head are aligned in the track direction of the recording medium, and said recording head and said reproducing head are mounted to said objective lens for said recording head and said objective lens for said reproducing head on the same side so that said recording head and said reproducing head are aligned in the track direction.

10. The composite magnetic head as set forth in claim 1, further comprising:

heat source control means for controlling said heat sources for said recording head and said reproducing head respectively, whereby when recording said heat source for said reproducing head is inactivated, and when reproducing said heat source for said recording head is inactivated.

11. The composite magnetic head as set forth in claim 10, wherein each of said heat sources includes:

laser emitting means for emitting a laser beam, and focusing means for focusing the laser beam emitted from said laser emitting means to form a light beam spot, and said heat source control means includes:

a liquid crystal shutter mounted on a light incident surface of said focusing means, and drive voltage supply means for applying a drive voltage to said liquid crystal shutter.

12. The composite magnetic head as set forth in claim 11, wherein:

said focusing means is provided with two diffraction gratings for said recording head and said reproducing head respectively;

said liquid crystal shutter includes a recording side region formed on the light incident surface side of the diffraction grating for the recording head and a reproducing side region formed on the light incident surface side of the diffraction grating of said reproducing head; and said recording side region and said reproducing side region can be controlled independently between a light transmissive state and a light shielded state.

13. The composite magnetic head as set forth in claim 3, further comprising:

shielding means for shielding said focusing means from a light beam to be formed into a light beam spot for said reproducing head when recording, while shielding said focusing means from a light beam to be formed into a light beam spot for said recording head when reproducing.

14. A composite magnetic head device, comprising: a recording head for magnetically recording information on a recording medium;

a reproducing head for magnetically reproducing information from the recording medium; and an objective lens to which said recording head and said reproducing head are mounted, said objective lens including a diffraction grating for said recording head for use in forming a light beam spot for said recording head by focusing an incident laser beam, and a diffraction grating for said reproducing head for use in forming a light beam spot for said reproducing head by focusing an incident laser beam.

15. An information recording and reproducing device, comprising:

said composite magnetic head device of claim 2, and tracking control means for controlling a tracking operation based on information obtained from a reflected light of the light beam spot from said recording medium.

16. An information recording and reproducing device, comprising:

said composite magnetic head device of claim 14, and tracking control means for controlling a tracking operation based on information obtained from a reflected light of the light beam spot from said recording medium.

* * * * *